United States Patent [19]

Petit et al.

[11] Patent Number: 4,993,270
[45] Date of Patent: Feb. 19, 1991

[54] PROCESS AND DEVICE FOR MEASURING THE PRESSING FORCE BETWEEN THE ROLLS OF A ROLL STAND

[75] Inventors: Pierre Petit, Maizieres-les-Metz; Patrice Ratte, Indre; Jacques Loubet; Michel Machet, both of Metz, all of France

[73] Assignee: IRSID, Maizieres-les-Metz, France

[21] Appl. No.: 160,447

[22] Filed: Mar. 17, 1989

[30] Foreign Application Priority Data

Feb. 25, 1987 [FR] France ................................ 87 02959

[51] Int. Cl.⁵ ............................................ G01L 5/00
[52] U.S. Cl. ................................. 73/862.55; 72/19; 72/21; 72/35
[58] Field of Search .................. 72/19, 20, 8, 17, 21, 72/35; 73/1 B, 862.55, 862.04, 862.54, 862.38; 33/657

[56] References Cited

U.S. PATENT DOCUMENTS 3,918,302 11/1975 Skelton et al. ...................... 73/1 B
4,016,756 4/1977 Kunkle .............................. 73/862.55
4,131,004 12/1978 Eibe ....................................... 72/8

FOREIGN PATENT DOCUMENTS 48-28269 8/1973 Japan ............................... 73/862.55
60-15534 1/1985 Japan ............................... 73/862.55
60-179622 9/1985 Japan ............................... 73/862.55

Primary Examiner—Lowell A. Larson
Assistant Examiner—T. C. Schoeffler
Attorney, Agent, or Firm—Pollock, VandeSande & Priddy

[57] ABSTRACT

Process for measuring the forces between the working rolls of a roll stand, in which several extended load cells (51, 52, 53) placed between the working rolls (13, 14) are aligned in a plane passing through the axes of these rolls and distributed symmetrically with respect to the central plane of the stand, a pressing force is exerted on the balances by adjusting systems (27, 28), the value of the forces exerted simultaneously on each load cell is read and the values of the resulting pressing forces are deduced. Preferably, a device comprising two half-shell shaped pieces of malleable material such as copper is used, and this holds the load cells in alignment and serves as a bearing plate which can be cold-rolled. The process is applied to the adjustment of the gauges of a roll stand for flat products and to the precise determination of the yield curves.

12 Claims, 2 Drawing Sheets

PROCESS AND DEVICE FOR MEASURING THE PRESSING FORCE BETWEEN THE ROLLS OF A ROLL STAND

FIELD OF THE INVENTION

The present invention relates to a process and a device for measuring the pressing force between the rolls of roll stands.

BACKGROUND OF THE INVENTION

It is known that determination of the rolling load (or rolling force) is practically essential for any rolling operation, in order to set the different operating parameters of each stand, to optimize the overall functioning of the rolling mill and to ensure the good quality of the rolled product. This is all the more important where the process of rolling has been automated, where the rolling force in one stand can then intervene as an adjustment parameter not only in the stand concerned but also in other stands in the mill train.

It is also necessary, in order to obtain the desired section and thickness of product, to determine the yield of the stands, i.e., the variation in distance between the working rolls as a function of the rolling force, the adjustments of the stand (position of the screws or positioning jacks for the chocks) otherwise being unchanged.

In general, measurement of the rolling load is carried out by means of gauges for measuring forces placed between the chocks of the support rolls and the housings of the stands or the screw (or jack) systems for adjusting the distance between the working rolls.

These gauges thus in fact measure the pressing force transmitted by these adjustment systems to the chocks of the support rolls and not the actual rolling force which is in fact exerted at the generatrix of the working rolls. The difference between the actual rolling load and the load measured by the gauges results from friction or jamming which may occur between the chocks and the stand, and also from a non-uniform distribution of the rolling force over the length of the rolls, which has the result of a disturbance of equilibrium between the gauges located on either side of the stand.

The same factors, plus deflection of the rolls, crushing at the contact generatrices and the varying play existing at the bearings, also have an effect on the determination of the yield.

Furthermore, it has been found that the gauges permanently installed on the stands can undergo a shift over time owing to the varying and considerable constraints to which they are subjected during rolling.

It is thus necessary to readjust these gauges periodically. The currently used adjustment process consists in removing the gauges and in having them checked in the laboratory on an appropriate measuring bench. This method has two main disadvantages. Firstly, the stand intervention time for disassembling and reassembling, added to the time required for the checking itself, is considerable and can lead to stopping the mill. Secondly, since the adjustment is made at a location other than the normal one for the gauges, it does not enable the particular characteristics of each stand to be taken into consideration, nor to reflect the actual rolling load precisely.

Processes and devices enabling the forces exerted between the working rolls of roll stands to be measured are known. U.S. Pat. No. 4,131,004 in particular describes a process of this type, which uses a device comprising several load sensors kept in alignment in a frame, and which are inserted between the rolls. This process is essentially intended to predetermine the adjustments of the stand, to obtain uniform distribution of the load over the length of the rolls.

SUMMARY OF THE INVENTION

An object of the present invention is to enable gauges of roll stands to be adjusted in situ under conditions which are as close as possible to the actual operating conditions, and more particularly in the case of mills for flat products of small thickness.

Another object is to improve the precision of the measurement while facilitating it by using measurement means which are easy to handle.

Another object is to carry out this adjustment in as short a time as possible.

Yet another object is to gain a better knowledge of the yield curve, i.e., of the curve as a function of the actual rolling force.

In order to achieve these objects, the invention relates in particular to a device for measuring pressing forces between the rolls of a roll stand, comprising several load sensors which are kept in alignment, said sensors being extended flat load cells of the same thickness arranged between two bearing plates comprising means of keeping the load cells or alignment, the bearing plates being constructed in a malleable material capable of being cold-rolled under the action of the compression forces to which the plates are subjected when the device is pressed between the rolls.

This device is particularly advantageous, since it keeps the load cells aligned and greatly facilitates their positioning between the working rolls and the maintainance of their relative position during the different handling movements and measurements. Furthermore, the presence of a malleable material between the upper and lower faces of the load cells respectively and the rolls ensures, by means of deformation of the said material, transmission of the force over the entire surface of the load cells, avoiding local overloading, which would inevitably be produced in the case of direct contact between the load cells and the rolls as a result of irregularities or defects, even if very small, of the hard surfaces in contact. As will be indicated by the following, a contact at a point or over a very small surface would have the effect of a punch and would make any measurement impossible and inaccurate.

Furthermore, the presence of the said malleable material permits compensation of the differences in thickness of the load cells, which difference, however small they may be, run the risk of falsifying the measurements. It will be seen that, in the case of a device of the type described in the above-mentioned U.S. Pat. No. 4,131,004, a minimal difference in thickness of the load sensors is capable of invalidating the adjustments made by means of this device, with a result that in the long term rolled products of variable transverse thickness are obtained.

The invention also relates to a process for measuring pressing forces between the rolls of a roll stand provided with means for adjusting the distance between the working rolls, this process employing the device according to the invention and being characterized in that:

the device is placed between measurement rolls having a straight-line generatix and being arranged at the location of the working rolls, such that the load cells are aligned in a plane passing through the axes of the measurement rolls and distributed, symmetrically with respect to the central plane of the said stand perpendicular to the axes of the rolls, over at least part of the length of the generatrices of the said rolls:

the said measurement rolls are brought closer with the aid of the adjustment means in order to exert a pressing force on the load cells;

the said adjusting means are adjusted to exert a pressing force on the load cells;

the said adjusting means are adjusted in order to make the forces to which the end load cells of the load cell assembly are subjected substantially equal; and the value of the forces exerted simultaneously on each load cell is read to deduce the value of the resulting pressing force.

According to a particular device of the invention, the process is applied to a roll stand provided with gauges for measurement of the rolling load, located at the means for adjusting the working rolls, and the said gauges are adjusted with the aid of the values read of the forces exerted on the load cells.

Advantageously, several measurements of the force to which the load cells are subjected are carried out, varying the pressing force, which enables the curve of adjustment to be established, giving the value of the actual force measured by the load cells as a function of the value indicated by the gauges of the stand.

According to another particular arrangement, the process is applied to the determinatin of the yield curve in that, for each measurement of the force between rolls, the position of the adjustment means is also read, and the value of yield as a function of the force measured is deduced from this.

An advantage of the process according to the invention resides in the fact that it enables the gauges of the stand to be adjusted "in situ", and thus rapidly without disassembling or reassembling and without risk of immobilizing the mill.

Another advantage is that this adjustment is carried out under conditions similar to those of rolling, the assembly of the load cells distributed over the generatrix of the rolls acting, in the case of a roll stand for flat products, as a simulated metal sheet, because of the distribution of the force over a length corresponding to the width of a rolled sheet.

Moreover, as a result of this process, it is easy to determine the yield curves of corresponding to the widths of flat products or rolled sheets. To this end, several series of measurements are carried out, using for each series a number of balances such that the length of the generatrix portion that they cover is equal to a predetermined product width (with the load cells not necessarily being completely abutting, however).

It is also possible, as a result of this process, by comparing the values given by the different load cells, to observe any disturbances of equilibrium between the two sides of the stand, which could be produced as the load is varied; these disturbances in equilibrium indicate anomalies in the operation of the guide or adjustment systems of the stand, the measurements carried out by the process of the invention therefore enabling any defects in the stand to be indicated.

BRIEF DESCRIPTION OF THE DRAWINGS

Other characteristics and advantages will become evident by reading the description which follows, of an embodiment of the device according to the invention and of its use for the adjustment of gauges for measuring permanent forces on a roll stand for flat products.

Reference will be made to the attached drawings, in which.

DESCRIPTION OF PREFERRED EMBODIMENTS

Figure 1:
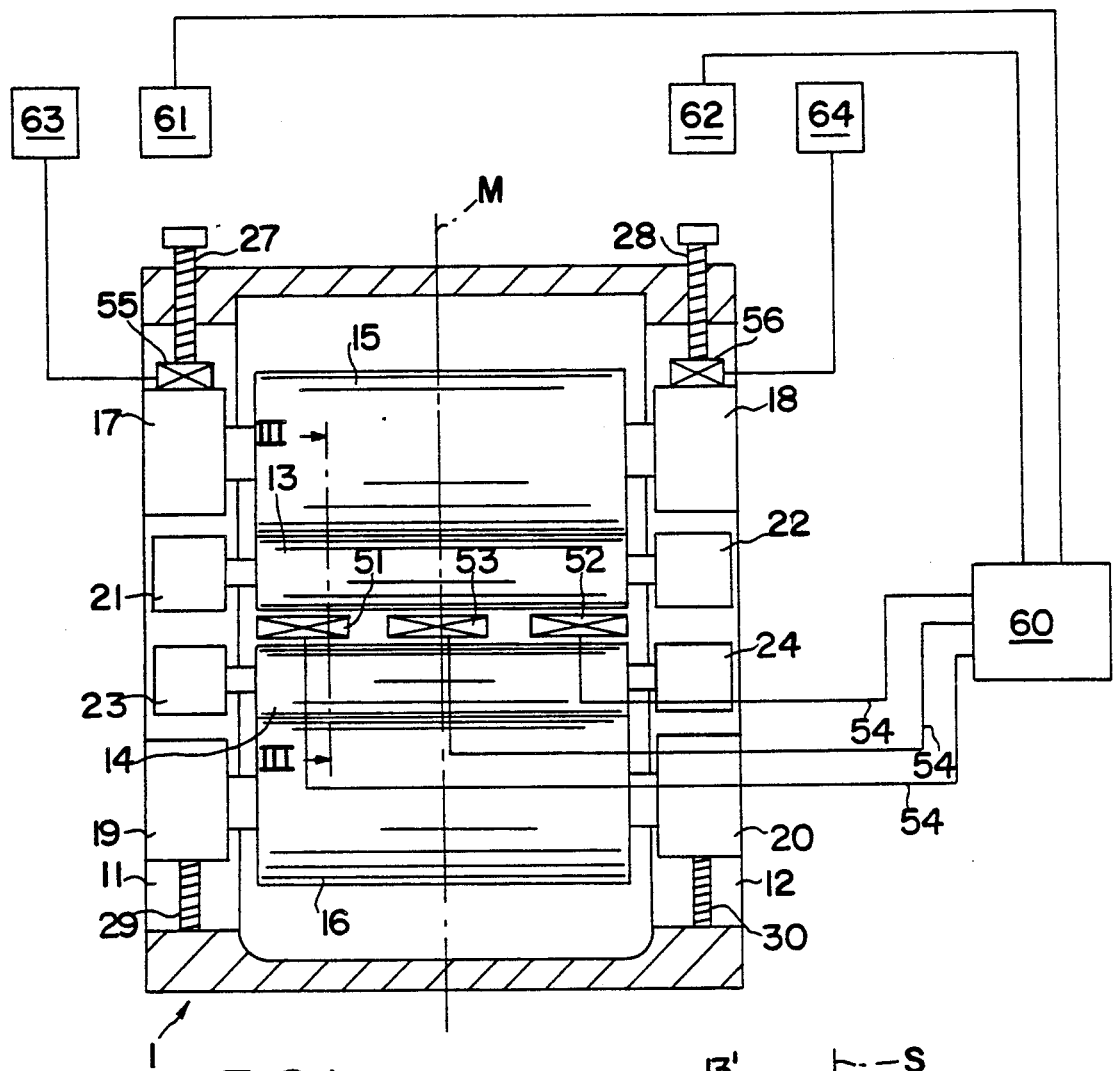
FIG. 1 is a diagrammatic front view of a roll stand with the load cells and adjustment apparatus.

The roll stand shown in FIG. 1 comprises two roll housings 11, 12, between which there are arranged, in the place of two working rolls, measurement rolls 13, 14 and in conventional manner, respectively above and below the latter, two support rolls 15, 16. The measurement rolls are rolls with dimensional characteristics similar to those of working rolls conventionally used on this stand. It is possible to use discarded, resurfaced rolls mounted specifically for carrying out the adjustment. It is also possible, under certain conditions which will be mentioned in detail below, to retain the working rolls, which avoids the operations of disassembling and reassembling the latter.

The measurement (or working) rolls 13, 14 are held by their ends in chocks 21, 22, 23, 24 which are capable of sliding vertically in the housings 11, 12.

Similarly, support rolls 15, 16 are held by the chocks 17, 18, 19, 20, which are also sliding, and on which come to bear the adjustment systems of the roll gap between the working rolls. These systems for adjusting the relative distance between the working rolls are shown schematically in FIG. 1 by screw systems 27, 28, 29, 30. However, at present it is normal for these systems to be hydraulic jack systems.

Between the upper adjustment screws 27, 28 and the chocks 17, 18 there are placed the gauges 55, 56 for measuring the forces of the stand. These gauges are connected to force indicators 63, 64 which indicate the forces recorded by each gauge or else give the total and the difference thereof, with a view to determining the resulting total force and an indication of the disturbance of equilibrium between the two sides of the stand.

There will now be described the general process according to the invention of adjusting these gauge/indicator assemblies 55, 56, 63, 64. For this purpose three extended flat load cells 51, 52, 53 are arranged in the roll gap between the rolls, aligned parallel to the axes of the latter, one at each end and the third in the cneter. In the example chosen, each load cell can support a force of 5,000 kN, and the use of three load cells is necessary for carrying out the different measurements without the risk of overloading one load cell.

Each load cell is connected by means of a connecting cable 54 to a computer which has the extensometer bridges relating to each load cell, and which enable the different calculations necessary for obtaining the indication of the forces exerted on the two sides of the stand on the displays 61, 62, to compare them with the values read on the indicators 63, 64.

Once the load cells are in place, the rolls 13, 14 are brought closer until a pressing force is exerted on the load cells. As a result of the adjustment means, 27, 28, the pressing forces are kept in balance as precisely as possible, by attempting to obtain identical values on the displays 61, 62. It has been found that these values do not necessarily correspond to the loads borne by the end load cells 51, 52; they are in fact obtained by the computer 60 from signals coming from each load cell which can be processed in different manners. A particular method consists, for example, in adding the signal coming from an end load cell to one-half the signal coming from the middle load cell. Other methods of calculation of the displayed value can be used, in particular in order to take into account the characteristics of the stand (round-end rolls, devices for adjusting the curvature or the balancing) or of a number of load cells other than three.

The balancing of the loads between the two sides of the stand having been carried out, the value is read on each indicator 63, 64, and on the display 61, 62, corresponding to the same side.

By simultaneously adjusting the adjusting systems 27, 28, the overall force is varied, and, for each adjustment position, the values displayed by the indicators and the display units are read. It is thus possible to establish for each of the force gauges 55, 56 of the stand an adjustment curve. If the stand is part of an automated mill, the adjustment curves can be stored in the automation system and the use in operation of an automatic correction of the indications given by the gauges 55, 56, permanently mounted on the said stand.

In parallel with the adjustment measurements, and in order better to monitor the thickness of the rolled product, it is possible advantageously to establish the curves yield of the stand by reading the position of the adjustment elements, as a function of the force measured between rolls, which, because of the invariability of the distance between rolls during measurement, corresponds to the variation in operation of this distance as a function of the rolling force.

It is also possible to carry out other measurements in order to gain additional knowledge of the characteristics of the stand in question. In particular, it is possible to bring the end load cells closer to one another, which enables the behavior under load of the stand to be studied for different widths of product. In fact, the assembly of extended load cells which are used can be similar to a metal sheet having a width equal to the distance between the furthest apart faces of the two end load cells 51, 52. One of the essential points for maintaining this simulation is to maintain good distribution of the load cells over the "width" of sheet in question, and the number of load cells used can be varied so as to fulfil this condition as well as possible.

Figure 2:
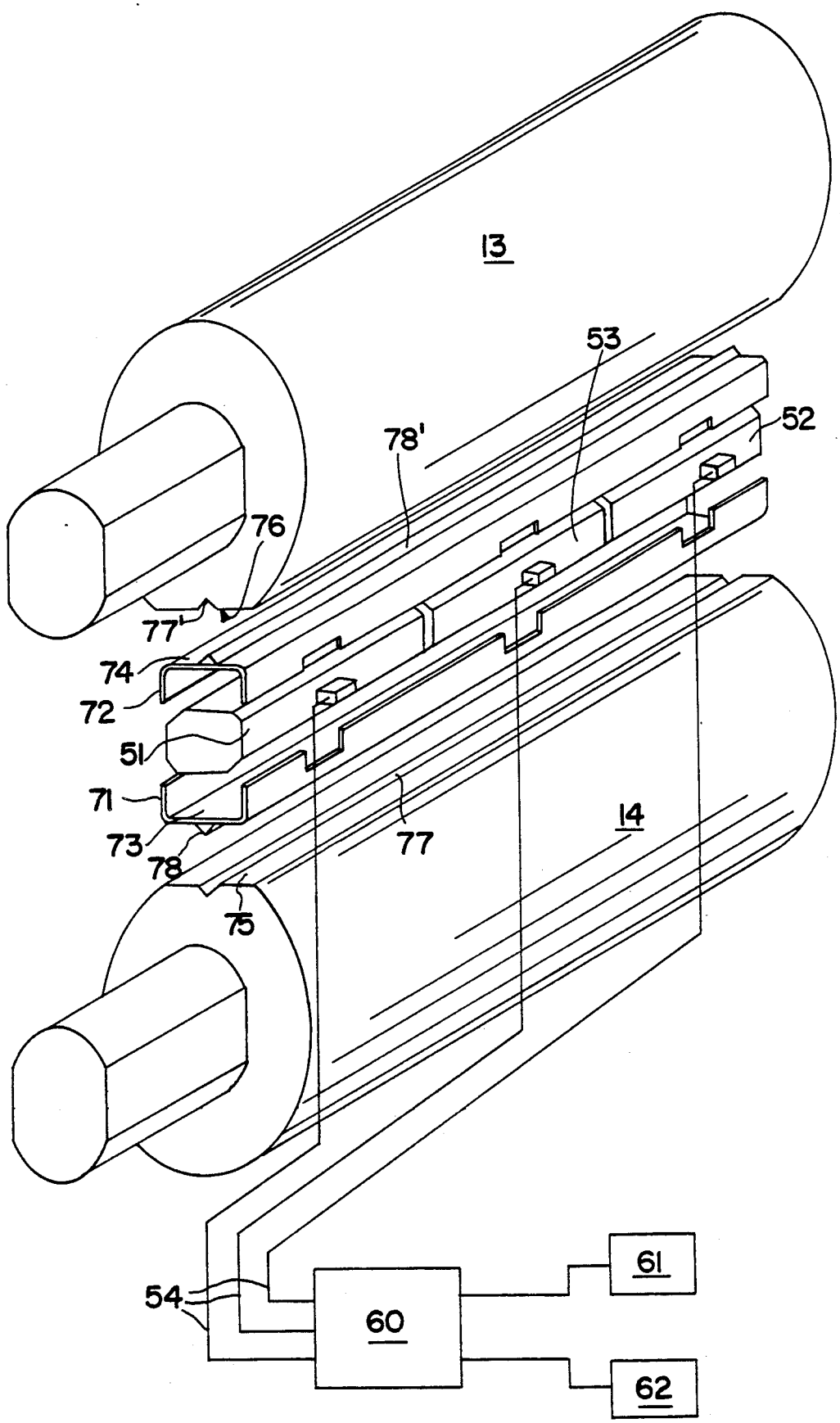
FIG. 2 is a diagrammatic perspective view of a device according to the invention placed between measurement rolls.

In this connection it is interesting to note, before describing the device shown in FIG. 2, that two problems occur in the implementation of the process described above.

In fact, in order to maintain the desired characteristic for the consistent measurement to be as close as possible to the actual conditions of operation of the stand (simulation of the load cell assembly of a "simulated sheet"), it is necessary to use load cells of small thickness, this thickness moreover being limited by the possible distance, which is also small, between the working rolls and the roll stand for flat products. Since the forces applied are very large, it is necessary that the surface of the load cells be sufficient to bear the pressure exerted by the rolls. One is therefore inconsistent confronted by the requirements on the one hand, for load cells capable of bearing large loads and thus having a considerable bearing surface (which frequently means load cells which also have a relatively great height) and on the other hand, for load cells whose height is small to enable them to be positioned between the rolls.

It can easily be understood that, the surface of the load cells and the rolls not being perfectly planar and smooth, and the faces in contact also not being perfectly parallel, there is a great risk of obtaining pressure points on the surfaces of the said load cells.

Apart from a deterioration of these surfaces, there is also a risk of major errors in measurement. In fact the flat load cells are typically made up of a working part of high-strength metal and of rectangular section. In a conventional manner, several strain gauge assemblies of strain gauges, distributed over two opposing side faces of the working part, adhere to the latter, such that a signal, which is directly dependent on the force exerted perpendicularly to the other two large side faces of the working part. Since the compression forces employed are higher than 10,000 kN between rolls in the example here considered it is necessary, if the load cell is to be reliable, for the working part to have a longitudinal section, and thus a length, which is sufficient for the strains created by these large forces to remain sufficiently well below the limit of elasticity of the material of the working part. It is therefore also necessary to place a sufficient number of gauges on the working part and, because of the small thickness of the load cell and therefore that of the working part, the gauges are relatively close to the upper and lower faces of the load cell which are subjected to the compressive force.

Because of this, a "point" force on one of these surfaces influences only the gauge (or the several gauges) situated directly adjacent to this point (in the zone of the "cone of action" of the force), to the exclusion of the other gauges which are more numerous and further away from this point. As a result, since these latter gauges do not transmit any signal, the resulting signal is distorted. Moreover, the considerable load acting on a single gauge can lead to saturation of the latter, which gives a false measurement and even runs the risk of destroying it.

The device according to the invention, shown in FIG. 2, is designed to avoid these disadvantages. It essentially fulfils two functions, namely, (1) the protection of the surfaces of the load cells and the distribution of the forces on them, and, (2) the maintenance in position of the load cells with respect to one another and with respect to the rolls.

The device is made up of two half-shell shaped parts 71, 72 of copper and of U-shaped cross-section, which are opposite one another, placed on either side of the load cells 51, 52, 53 such that the bases of the U's forming planar bearing plates 73, 74 are opposite the bearing faces of the load cells. The wings of the shellshaped parts laterally cover the balances and, their spacing, being equal to the width of the said load cells, keep the latter in alignment. In these wings there are notches for the passage of outlet connections and cables 54 connecting the load cells to the extensometer bridges and to the computer 60.

According to FIG. 2, the measurement rolls 13, 14 are each provided with a half-flat part 75, 76. These half-flat parts are machined in worn rolls which, during the measurement and adjustment operations, are held in fixed rotation, the half-flat parts 75 and 76 being parallel and opposite one another. A groove 77, 77' is machined in the centre of each half-flat part, parallel to the axis of the rolls. Each shell-shaped part has on the outside a corresponding rib 78, 78' along the axis of the bearing face 73, 74 and intended to facilitate the positioning of the device between the rolls in the plane passing through the axis of the latter. During handling operations, the rib/groove system enables the device to be held in position without the risk of sliding over the half-flat parts outside the said plane.

It is also possible for the shell-shaped parts not to have a rib but only a centering mark at each end, which is used during initial positioning. A slight rib will form automatically when the device is first put under a load by the deformation and the cold-rolling of the copper.

The device is advantageously used for measuring force on stands provided with rapid roll exchange systems. In this case, typically, the play of the measurement rolls and the device positioned and aligned between them is prepared before setting up the assembly in the stand, in the place of the working rolls. When the assembly is in place, as a result of the pressing means, a considerable force is exerted which is at least equal to the maximum force which will be applied during measurement. This preloading is intended to cold-rolling the copper, taking up the varying play of the stand and prebalancing the latter. Subsequently, this force is released until the minimum value desired for measurement is reached. However, it must be ensured that the value of the force does not fall too low, to avoid localized deloading of the device and possible displacement of the latter with respect to the rolls, or of the balances with respect to the shell-shaped parts, when the prints of the hard surfaces are already marked in the copper.

The preparation of the measurement rolls (machining of half-flat parts and grooves) takes place prior to the positioning of the device only when it is used for the first time. Subsequently, the measurement rolls can be reused. By contrast, it is preferable to change the shell-shaped parts for each adjustment, or to be more precise, each time the device will have been deloaded completely or dismantled, in order to avoid superimposed impressions of prints in the copper which is subjected to additional cold rolling with each major load.

The shell-shaped parts of U-shaped section can be replaced by two planar bearing plates comprising a rib for positioning the balances, with the latter comprising a corresponding groove on each bearing face. Similarly, it is possible for only the bearing plates of the shell-shaped parts of U-shape to be made of copper, the wings of U-shape then being of another rigid material.

It is also possible to replaces the positioning grooves and ribs by a simple marking line, which avoids the machining operations of the rolls, positioning then being carried out visually by matching the reference lines of the shell-shaped parts and the rolls.

Figure 3:
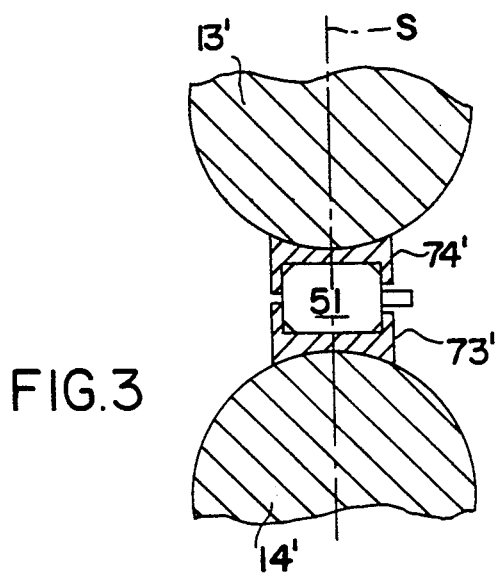
FIG. 3 is a cross-section of another embodiment of the device, showing its arrangement between two working rolls.

Another embodiment of the device is shown in FIG. 3. Here half-shell-shaped parts 73', 74' have a U-shaped section of which the base surface which comes into contact with the rolls is concave and has a radius of curvature equal to the radius of the working rolls 13' 14'. This device complicates the construction of the shell-shaped parts and increases its cost. However it enables adjustment to be carried out without the operation of assembling and disassembling the rolls, by placing the device directly between the working rolls.

The use of the device is not limited to in situ adjustment of the gauges mounted on the roll stands. As already indicated, it is suitable for the determination of the yield curves and also makes it possible to obtain additional information about the effects of adjusting curvature and balance.

The invention is applicable for any type of products which are to be rolled, flat or long products, in so far as the stand in question permits measurement cylinders of straight-line generatrix to be substituted for the working rolls, if desired.

It will be seen that, possibly with the aid of simple cuts in the sides of the shell-shaped parts to enable connection cables for the balances to be passed through, it is possible to use load cells of different lengths with the same type of shell-shaped parts, for example to use a greater number of them, and it is also possible to distribute them in a manner adapted to particular uses.

It will also be seen with respect to the load cells that, while being placed on the same working part, the gauges may all be grouped together in a single measurement bridge, or may form several measurement bridges. In the latter case, each load cell has several outlets and requires an apparatus for processing the largest signal. On the other hand, it is then possible to appreciate differences in load between adjacent zones in the same load cell.

We claim:

1. Device for measuring pressing forces between rolls (13 14) of a roll stand (1), said device comprising a plurality of aligned load sensors in the form of extended load cells (51, 52, 53) of uniform thickness arranged between two bearing plates (73, 74, 73', 74') and comprising means for keeping said load cells in alignment, said bearing plates being constructed of malleable material capable of being cold-rolled under the action of compression forces to which said plates are subjected when said device is pressed between said rolls.

2. Device according to claim 1, wherein bearing plates (73, 74, 73', 74') are of copper.

3. Device according to claim 1, wherein each extended load cell comprises a working part (51) of high-strength metal and of rectangular section, and several assemblies of strain gauges distributed over and adhering to two opposing side faces of said working part, such that a signal, correlated to a force exerted perpendicularly to said side faces of said working part, is transmitted.

4. Device according to claim 1, wherein said bearing plates (73, 74) are planar.

5. Device according to claim 1, wherein faces of said bearing plates (73', 74') contacting measurement rolls (13', 14') are concave, so as to match a curvature of said measurement rolls.

6. Device according to claim 4 or 5, wherein faces of said bearing plates contacting measurement rolls have at least rib engaging a corresponding at least one groove on said measurement rolls, parallel to their axis, to ensure that it is centered and kept in position between said measurement rolls.

7. Process for measuring pressing forces between working rolls of a roll stand provided with means (27, 28) for adjusting a distance between said working rolls employing a device comprising a plurality of aligned load sensors in the form of extended load cells (51, 52, 53) of uniform thickness arranged between two bearing plates (73, 74, 73', 74') and comprising means for keeping said load cells in alignment, said process comprising the steps of (a) placing said device between measurement rolls (13, 14 or 13', 14') having a straight-line generatrix and being arranged at a location of said working rolls such that said load cells are aligned in a plane (S) passing through axes of said measurement rolls and distributed, symmetrically with respect to a central plane (M) of said stand and perpendicular to said axes of said rolls, over at least part of a length of said generatrices of said rolls;

(b) bringing said measurement rolls closer with the aid of adjustment means (27, 28) in order to exert, prior to measurement, a first pressing force on said load cells (51, 52, 53) said first pressing force being at least equal to a maximum force to be applied during measurements, and then releasing said pressing force without, however, canceling said pressing force;

(c) adjusting said adjusting means in order that a second pressing force is exerted, and the forces to which end load cells (51, 52) of said load cell assembly are subjected are made substantially equal; and (d) reading a value of forces exerted simultaneously on each load cell to deduce a value of a resulting pressing force.

8. Process according to claim 7, including placing said device between said measurement rolls prior to measurements, aligned with the direction of axes of said rolls, pre-mounting said rolls outside said stand, and then introducing said assembly comprising said rolls and said device into working position in said stand.

9. Process according to claim 7, wherein, concomitantly with measurement of pressing force, the yield of the stand is measured and a yield corresponding to said pressing force is determined.

10. Process according to claim 9, wherein a plurality of series of measurements are carried out, using for each series a number of load cells such that the length of the generatrix portion that they cover is equal to a predetermined value, and yield curves corresponding to rolled products of a width equal to said length is determined.

11. Process according to claim 7, applied to the rolling of flat products, wherein said working rolls (13', 14') are used as measurement rolls.

12. process according to claim 7, wherein said working rolls are replaced by measurement rolls (13, 14) having a half-flat part (75, 76), and wherein said rolls are locked against rotation such that said half-flat parts are opposite one another.

* * * * *

UNITED STATES PATENT AND TRADEMARK OFFICE
CERTIFICATE OF CORRECTION

PATENT NO. : 4,993,270
DATED : February 19, 1991
INVENTOR(S) : Petit et al.

It is certified that error appears in the above-identified patent and that said Letters Patent is hereby corrected as shown below:

Col. 8, Claim 6, line 60, after "least" insert --one--.

Signed and Sealed this

First Day of February, 1994

Attest:

BRUCE LEHMAN

Attesting Officer

Commissioner of Patents and Trademarks